Oct. 9, 1945.  H. JOHNSON  2,386,319
APPARATUS FOR TESTING BONDS IN LAMINATED METALLIC ARTICLES
Filed Jan. 13, 1943
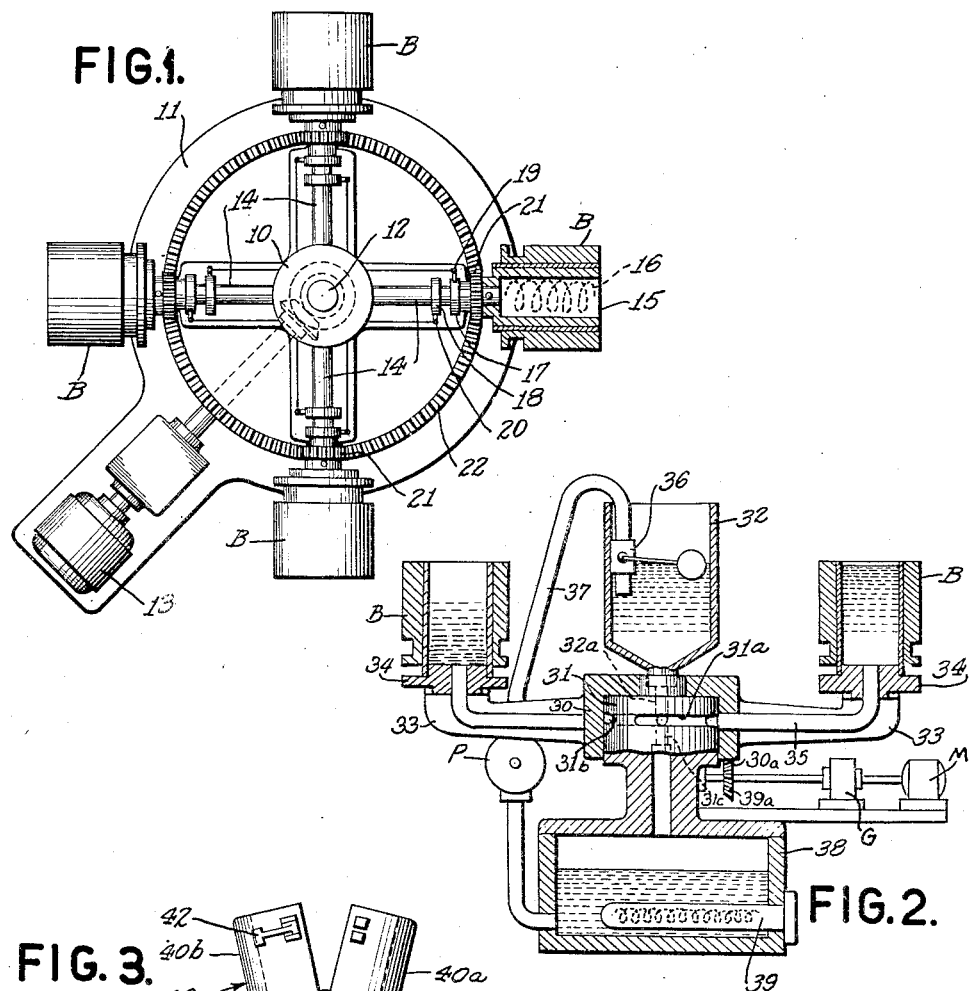
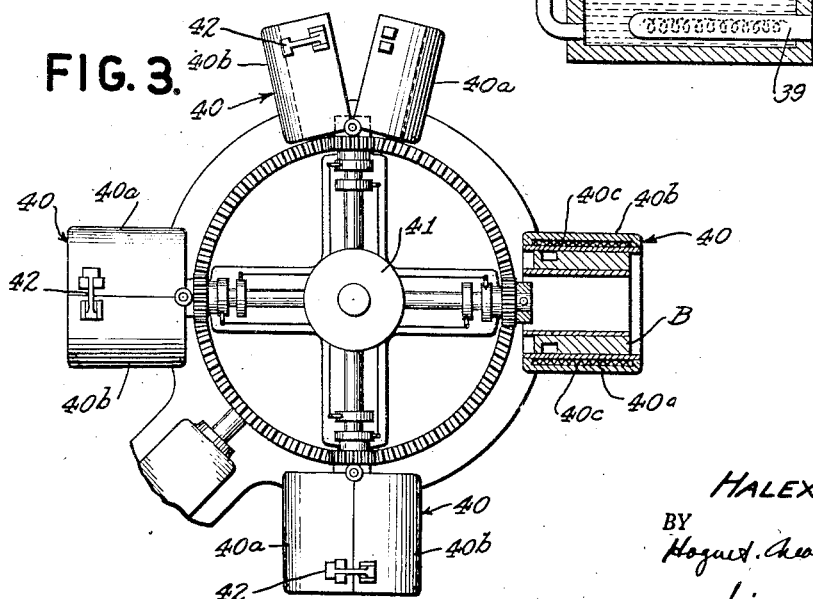
INVENTOR.
HALEX JOHNSON
BY
his ATTORNEYS Patented Oct. 9, 1945

2,386,319

UNITED STATES PATENT OFFICE 2,386,319

APPARATUS FOR TESTING BONDS IN LAMINATED METALLIC ARTICLES

Halex Johnson, Massapequa, N. Y., assignor to Fairchild Engine and Airplane Corporation, Farmingdale, N. Y., a corporation of Maryland Application January 13, 1943, Serial No. 472,190

6 Claims. (Cl. 73—15)

This invention relates to apparatus for testing materials and it relates particularly to apparatus for testing the bond between two or more bonded layers of metal.

In the manufacture of cylinders for air-cooled airplane engines, for example, it is now the practice to cast a sleeve or "muff" of aluminum or aluminum alloy on a tubular steel cylinder barrel. During a later stage of manufacture, the muff is machined to shape it into a large number of radiating fins for dissipating heat from the cylinder. It is essential to the proper operation of such engines that an intimate bond be obtained between the barrel and the muff so that heat may be conducted efficiently from the barrel to the muff to avoid overheating of the cylinder. Moreover, inasmuch as the coefficients of expansion of these metals differ considerably, it is necessary that a strong mechanical bond be obtained between the barrel and the muff to preclude separation of these elements.

Occasionally impurities, such as slag or the oxides of the metals, settle or are formed at the interface between the muff and the barrel, before or during bonding, and thus preclude the formation of a sound bond at that point. Accordingly, the bond is discontinuous and a zone or zones of weakness and lower heat conductivity are formed between the barrel and muff. During operation, because of expansion and contraction of the elements, additional areas around these weak zones are weakened, causing progressive separation of the muff from the cylinder barrel, with the result that the muff may, in time, separate substantially completely from the steel barrel, causing failure of the engine.

Ordinary visual inspection of the cylinders will not disclose the zones of weakness and lower heat conductivity at the interface between the layers of metal and even X-ray examination of the cylinders is not entirely reliable.

An object of the invention is to provide an apparatus for facilitating the inspection of cylinders in order to determine the uniformity of the bond between the cylinder barrel and the muff.

A further object of the invention is to provide apparatus for determining the uniformity of the bond between layers of bonded metals.

Other objects of the invention will become apparent from the following description of typical apparatuses embodying the present invention.

In accordance with the present invention, I have provided apparatus for inspecting laminated metallic articles by determining the uniformity of heat conductivity through the layers of metal and the bond between the metals. More particularly, the apparatus includes means for uniformly heating one surface of a laminated article. The uniformity of the bond can then be determined by observing the response of an indicator on the opposite side to the heat conducted through the laminated article. If the indicator shows a uniform response, it is clear that impurities are not included in the laminated article and that the bond is uniform. On the other hand, should the response of the indicator be non-uniform, the article undergoing test should be discarded inasmuch as it is evident that the bond is not uniform or that some impurity is included which affects the heat conductivity of the article.

The laminated assembly may be heated in a number of different ways. For example, a cylinder may be mounted on or inside a fixture which is provided with an electric heating unit so that a surface of the cylinder is uniformly heated. Another mechanism for heating the cylinder may consist of a fixture having a plug thereon which fits into one end of the cylinder and permits the cylinder to be filled with a heated liquid such as hot oil. The apparatus may be provided with automatic controls so that it can deliver the article undergoing inspection past an inspection station and heat the article during its passage before the inspection station.

The indicator used in the operation may be of widely varying type. For example, aqueous solutions of certain glucosides such as parillin or smilacin can be applied to the surface of the article undergoing test. These compositions change in color in response to changes in temperature and thus are effective in indicating whether or not the heat conductivity of the article and the bond in the laminated metal are uniform or whether the layers of the metal are homogeneous.

Other heat-responsive materials such as paints containing cuprous iodide and mercuric iodide may also be used as indicators on the surface of the article.

Thus, by painting or spraying the surface of the article undergoing test with one of these indicating compounds and then applying heat to the other side of the article, an accurate indication of the uniformity of heat conductivity of the article is obtained and from the uniformity of heat conductivity, an accurate deduction can be made of the uniformity of the bond and the homogeneity of the layers of metal.

For a better understanding of the type of apparatus used in practicing the invention, reference may be had to the accompanying drawing in which:

Figure 1 is a top plan view of a typical form of device for heating cylinders electrically to determine the heat conductivity thereof;

Figure 2 is a view in vertical section of another form of device for heating cylinders by means of hot liquid; and Figure 3 is a view in section of another form of device for heating cylinders from the exterior so that the heat conductivity thereof can be determined by observing the inner surface of the cylinder.

The devices illlustrated in the drawing are applicable to the inspection of cylinders. It will be understood, of course, that they can be modified for use in the inspection of articles of different shape than cylinders and accordingly the apparatus disclosed herein should be considered as illustrative of the invention, only.

The device disclosed in Figure 1 includes a cylindrical head 10 rotatably mounted upon a fixed base 11 by means of a shaft 12 which is driven by means of a motor 13. Preferably, reduction gearing is interposed between the motor 13 and the shaft 12 so that the head 10 will be rotated slowly. Mounted upon the head 12 are a plurality of shafts 14, in this instance, four, which are capable of rotation relatively to the head. Each of the shafts 14 carries on its outer end a hollow cylindrical member or fixture 15 formed of metal, within which is mounted a heating coil 16 that is suitably insulated from the cylindrical member 15 so as to heat the member 15 uniformly. The coil is connected to the commutators 17 and 18 which are mounted on and insulated from the shaft 14. Current is conducted to the commutator through brushes 19 and 20 which are connected to a source of electrical energy.

Inasmuch as it is necessary to inspect all surfaces of the cylinder, it is desirable to rotate the cylinder during inspection. This rotation may be obtained by means of a small gear 21 fixed to each of the shafts 14 and meshing with a large gear 22 fixed to the base 11. Thus, as the head 10 rotates, the heating members 15 and the cylinder B are rotated about their axes.

During inspection, the cylinders B are painted or sprayed with a suitable heat indicating compound such as parillin or smilacin or other heat-responsive indicator and the cylinder slipped upon one of the heating members 15. As the head 10 rotates, the cylinders B become heated so that at the time they pass the inspection station, they are heated sufficiently to cause a change in the color of the indicator. If the change in color is uniform throughout, the cylinder may be removed and passed on for further treatment. If the change in color is not uniform, the cylinder may be discarded as defective.

Another form of inspecting apparatus is disclosed in Figure 2. In this apparatus, a rotary head 30 is mounted upon a manifold member 31 having a central bore therein to which a heated liquid, such as hot oil, may be delivered from a reservoir 32 above the manifold 31. The manifold 31 includes an arcuate channel 31a extending about one-third of the way around its outer surface which communicates with the conduit 32a leading from the reservoir 32. The rotary head 30 is provided with a plurality of arms 33 projecting laterally therefrom, each having at its outer end a substantially horizontal plug 34 rotatable about a vertical axis. Each plug 34 is adapted to be received in and seal one end of a cylinder B so that hot oil can be delivered into the cylinder B from the reservoir 32 through the channel 31a and a conduit or bore 35 which extends along the arm 33 and communicates with the interior of the cylinder B. The oil or other heated liquid is maintained in the reservoir 32 at such a level that it will substantially completely fill the cylinder, but not cause it to overflow. This can be accomplished by means of a float valve 36 mounted in the reservoir 32 which controls the flow of oil through a conduit 37 which communicates with an auxiliary reservoir 38 beneath the manifold 31. A centrifugal pump P may be used for delivering oil from the reservoir 38 to the reservoir 32.

In order to discharge the oil from the cylinder B after inspection, the manifold 31 is provided with a second channel 31b angularly spaced from the channel 31a which communicates with a central bore 31c that is connected to the lower reservoir 38. The rotary head 30 may be rotated by means of an electric motor M which is connected by means of a gear reduction unit G and a gear 39a with a ring gear 30a at the lower edge of the rotary head 30.

As the rotary head 30 revolves, the cylinder B is automatically filled, heated by the hot liquid and the liquid then drained from the cylinder B into the auxiliary reservoir 38 where it may be re-heated by any suitable heating means, such as the electric heater unit 39.

If desired, the plug 34 may be rotated about its axis manually or by means of a gear system, such as that shown in Figure 1, to permit inspection of all of the outer surfaces of the cylinder B.

In the device disclosed in Figure 3, the heating fixture 40 may be supported upon a rotor 41 similar to the rotor 10 of the device disclosed in Figure 1, and may be rotated in the same way. The fixture 40, however, is formed of two arcuate sections 40a and 40b which are hingedly connected so that they can be opened to receive the cylinder B and then clamped, as by means of the latches 42, around the cylinder B. Each of the sections 40a and 40b is provided with an electrical heating unit 40c so that heat may be applied uniformly to the exterior of the cylinder.

With the apparatus disclosed in Figure 3, the interior of the cylinder B may be sprayed or painted with the heat indicating compound and the uniformity of the bond and the homogeneity of the muff and cylinder barrel determined by inspecting the interior surface of the cylinder B.

While the present apparatuses are particularly suitable for the inspection of cylinders, it will be understood that they may be applied with only slight modification to the inspection of other laminated articles such as composite sheets of either flat or curved form, tubes of circular or non-circular cross-section and the like. Accordingly, it will be understood that the apparatus is susceptible to considerable modification without departing from the invention and that the method is applicable to the inspection of many different types of articles. Accordingly, the forms of apparatus and the methods described above should be considered as illustrative, only, and not as limiting the scope of the following claims.

I claim:

1. An apparatus for testing the bond between the layers of a laminated tubular metallic article, comprising a fixture receivable within and closely engaging said tubular article, means supporting said fixture for rotation to permit inspection of the outer surface of said article, and means for heating said fixture uniformly to heat said tubular article.

2. An apparatus for testing the bonds between the barrels and the muffs of cylinders, comprising a rotatable member, a plurality of cylindrical fixtures rotatably mounted on said rotatable member adapted to receive said cylinders, means for rotating the fixtures, and means for heating said fixtures uniformly.

3. An apparatus for testing the bonds between the barrels and the muffs of cylinders, comprising a rotatable member, a plurality of cylindrical fixtures rotatably mounted on said rotatable member and adapted to receive said cylinders, means for rotating said member and said fixtures simultaneously, and means for heating said fixtures uniformly.

4. An apparatus for testing the bonds between the barrels and the muffs of cylinders comprising a rotatable member, at least one fixture rotatably mounted on said member adapted to support and seal the lower end of a cylinder, means for rotating said rotatable member, a source of liquid, and means responsive to rotation of said rotatable member for sequentially connecting said cylinder with said source of liquid and draining the liquid from said cylinder.

5. An apparatus for testing the bonds between the barrels and the muffs of cylinders, comprising a rotatable member, a plurality of tubular fixtures rotatably mounted on said rotatable member adapted to receive said cylinders, means for rotating the fixtures, and means for heating said fixtures uniformly.

6. An apparatus for testing the bonds between the barrels of cylinders and muffs cast thereon comprising a rotatable member, a plurality of tubular fixtures rotatably mounted thereon adapted to receive said cylinders, each fixture including a pair of hingedly connected arcuate members movable into engagement with said muffs, means for heating said fixtures uniformly, and means for rotating said fixtures.

HALEX JOHNSON.